United States Patent
Eronen et al.

(10) Patent No.: US 11,429,189 B2
(45) Date of Patent: Aug. 30, 2022

(54) MONITORING

(71) Applicant: Nokia Technologies Oy, Espoo (FI)

(72) Inventors: Antti Eronen, Tampere (FI); Jussi Leppanen, Tampere (FI); Arto Lehtiniemi, Lempaala (FI); Junsheng Fu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 15/538,739

(22) PCT Filed: Dec. 21, 2015

(86) PCT No.: PCT/FI2015/050920
§ 371 (c)(1),
(2) Date: Jun. 22, 2017

(87) PCT Pub. No.: WO2016/102768
PCT Pub. Date: Jun. 30, 2016

(65) Prior Publication Data
US 2017/0364159 A1 Dec. 21, 2017

(30) Foreign Application Priority Data
Dec. 24, 2014 (EP) .................................... 14200312

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06V 20/52* (2022.01); *G08B 13/196* (2013.01)

(58) Field of Classification Search
CPC ....... G05B 15/02; G06F 3/017; G06F 3/0304; G06F 3/048; G06F 3/04842;
(Continued)

(56) References Cited

U.S. PATENT DOCUMENTS 6,185,152 B1 * 2/2001 Shen ..................... G01S 3/802
  348/E7.079
7,634,334 B2 12/2009 Monroe ........................... 701/3
(Continued)

FOREIGN PATENT DOCUMENTS

CN        103155642 A     6/2013
JP        2013025789 A     2/2013
(Continued)

OTHER PUBLICATIONS

"Remote sensing" from Wikipedia, published on Jan. 5, 2012 (Year: 2012).*
(Continued)

*Primary Examiner* — Reza Nabi
*Assistant Examiner* — Hwei-Min Lu
(74) *Attorney, Agent, or Firm* — Harrington & Smith

(57) ABSTRACT

A method including recognizing at least one gesture to define at least one computer-implemented virtual boundary in a monitoring space, wherein the gesture includes a motion along a path and at a location in a monitored scene space wherein there is a correspondence between the monitoring space and the monitored scene space; causing implementation of the at least one virtual boundary in the monitoring space corresponding to the scene space, wherein at least part of the virtual boundary is determined by the path in the monitored scene space and the at least part of the virtual boundary is located in the monitoring space at a corresponding location equivalent to the path location; and processing received data to generate a response event when there is,
(Continued)

Figure 1:
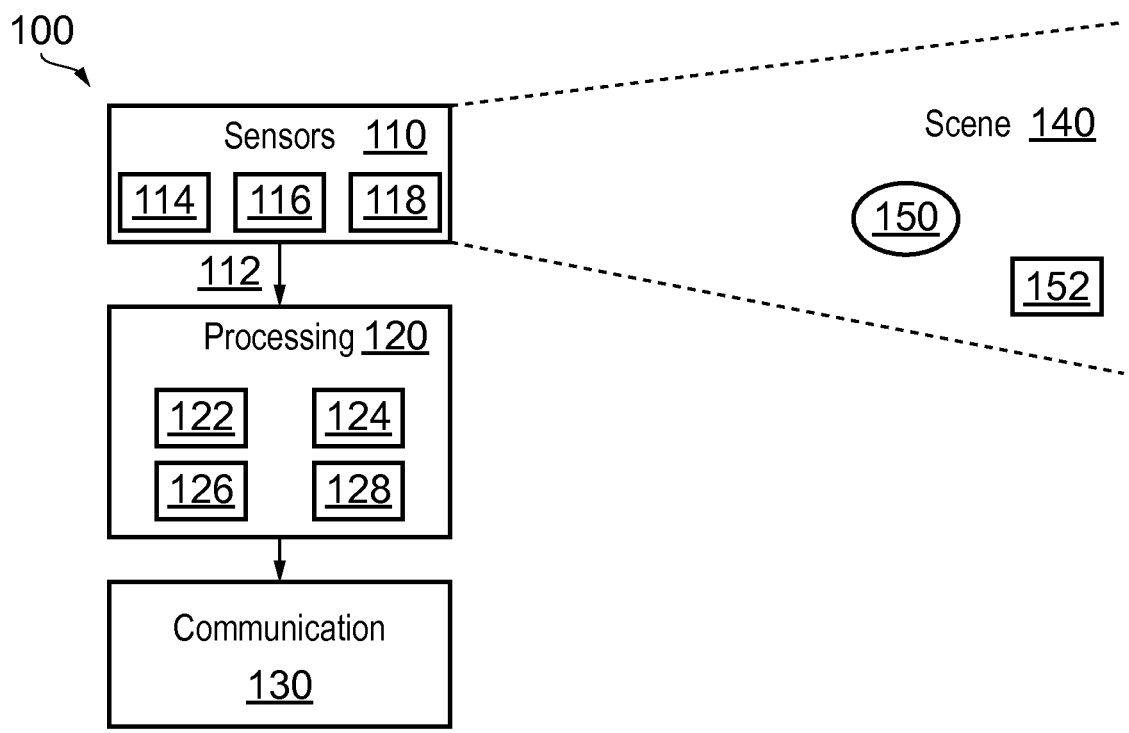

relative to the at least one virtual boundary, a change in a portion of the monitored scene space.

21 Claims, 7 Drawing Sheets

(51) Int. Cl.
  *G08B 13/196* (2006.01)
  *G06V 20/52* (2022.01)
(58) Field of Classification Search
  CPC .............. G06K 9/00771; G08B 13/196; G08B 13/19615; H04N 7/181; H04L 67/12
  USPC .................. 715/764, 848, 863; 345/154, 175
  See application file for complete search history.

(56) References Cited

U.S. PATENT DOCUMENTS

| | | | | |
|---|---|---|---|---|
| 9,392,212 | B1* | 7/2016 | Ross | G06T 19/006 |
| 2004/0138874 | A1* | 7/2004 | Kaajas | G10L 21/038 |
| | | | | 704/E21.011 |
| 2008/0099549 | A1* | 5/2008 | Bryan | H04W 52/0216 |
| | | | | 235/375 |
| 2013/0024819 | A1* | 1/2013 | Rieffel | G06F 3/011 |
| | | | | 715/848 |
| 2014/0002444 | A1* | 1/2014 | Bennett | G06T 19/006 |
| | | | | 345/419 |
| 2014/0015804 | A1 | 1/2014 | Mongia et al. | 345/175 |
| 2014/0092247 | A1* | 4/2014 | Clark | G08B 21/043 |
| | | | | 348/143 |
| 2014/0133664 | A1* | 5/2014 | Beaty | G01S 5/18 |
| | | | | 381/56 |
| 2014/0157156 | A1 | 6/2014 | Kawamoto et al. | |
| 2014/0354820 | A1 | 12/2014 | Danialian et al. | 348/154 |
| 2015/0022316 | A1* | 1/2015 | Dixon | G08B 25/008 |
| | | | | 340/5.51 |
| 2015/0022344 | A1* | 1/2015 | Matsuoka | G08B 25/10 |
| | | | | 340/523 |
| 2015/0022357 | A1* | 1/2015 | Gettings | G08B 29/181 |
| | | | | 340/568.1 |
| 2015/0077737 | A1* | 3/2015 | Belinsky | G01N 15/0211 |
| | | | | 250/208.2 |
| 2015/0169176 | A1* | 6/2015 | Cohen | G06F 3/017 |
| | | | | 715/852 |
| 2016/0125318 | A1* | 5/2016 | Scoffier | H04N 7/183 |
| | | | | 706/11 |
| 2017/0205891 | A1* | 7/2017 | Mason | G06F 3/0304 |

FOREIGN PATENT DOCUMENTS

| | | |
|---|---|---|
| JP | 2013031897 A | 2/2013 |
| WO | WO 2013/052383 A1 | 4/2013 |
| WO | WO 2014/117895 A1 | 8/2014 |

OTHER PUBLICATIONS

Konda et al., "An Intuitive Multi-Touch Surface and Gesture Based Interaction for Video Surveillance Systems", published in International Journal of Future Computer and Communication, 3(3), pp. 197-201, 2014. (Year: 2014).*

"Passive vs Active Sensors in Remote Sensing" from GIS Geography, May 21, 2015 (Year: 2015).*

* cited by examiner

MONITORING

TECHNOLOGICAL FIELD

Embodiments of the present invention relate to monitoring a scene. In particular, they relate to automated monitoring of a scene.

BACKGROUND

Current monitoring systems, such as surveillance systems, may comprise one or more cameras for video recording, with or without audio recording, connected via wires or wirelessly to a hub that stores or enables storage of the data recorded from the scene. An operator may, in some examples, be able to use the hub to program settings for the cameras and/or the hub.

BRIEF SUMMARY

According to various, but not necessarily all, examples of the disclosure there is provided a method as claimed in any of claims 1-13.

According to various, but not necessarily all, examples of the disclosure there is provided an apparatus as claimed in claim 14.

According to various, but not necessarily all, examples of the disclosure there is provided an apparatus comprising: at least one processor; and at least one memory including computer program code the at least one memory and the computer program code configured to, with the at least one processor, cause the apparatus at least to perform a method as claimed in any of claims 1-13.

According to various, but not necessarily all, examples of the disclosure there is provided computer program code that, when performed by at least one processor, causes a method of at least one of claims 1-13 to be performed.

According to various, but not necessarily all, examples of the disclosure there is provided a computer program that, when run on a computer, performs: a method as claimed in any of claims 1-13.

According to various, but not necessarily all, embodiments of the invention there is provided examples as claimed in the appended claims.

BRIEF DESCRIPTION

Figure 2:
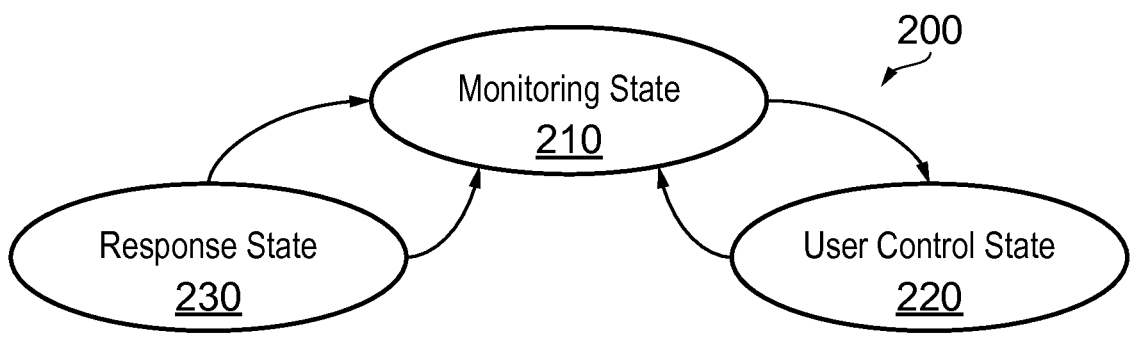
Figure 3:
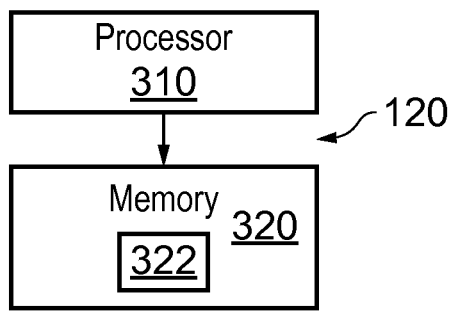
Figure 4:
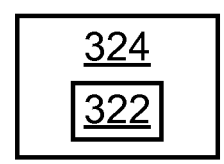
Figure 5:
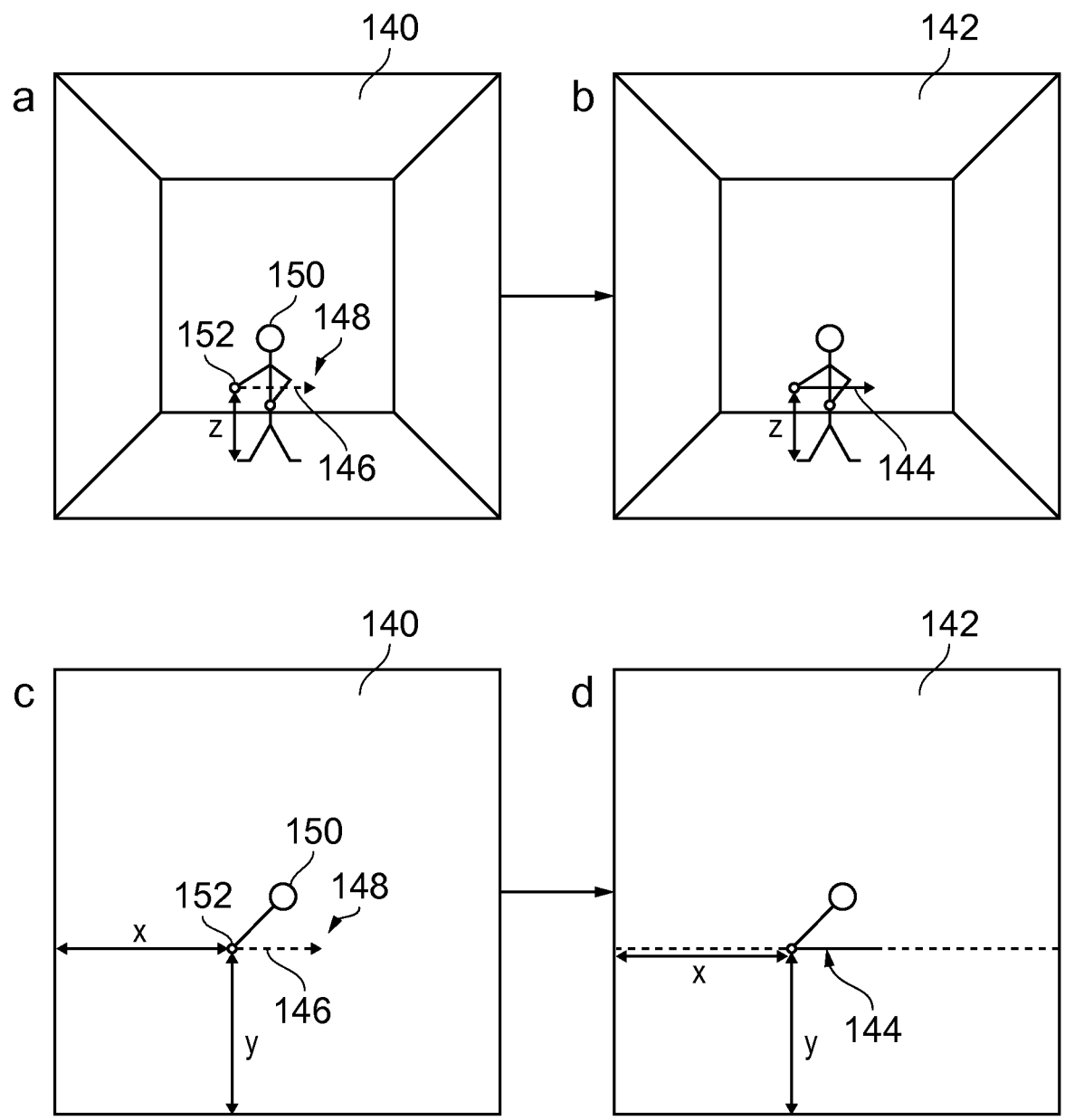
Figure 6:
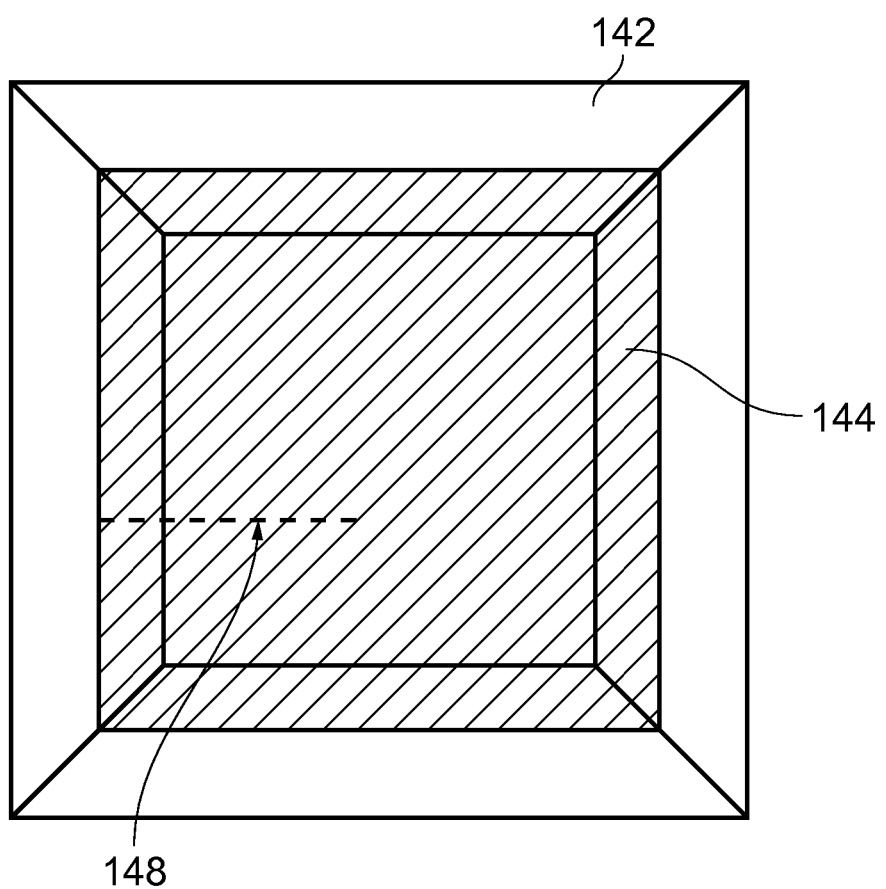
Figure 7A:
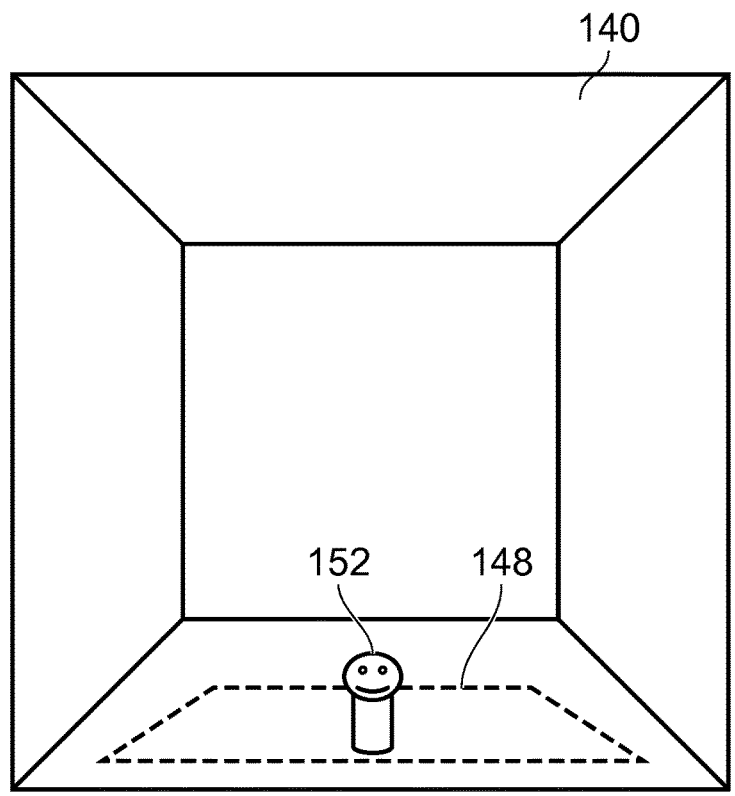
Figure 7B:
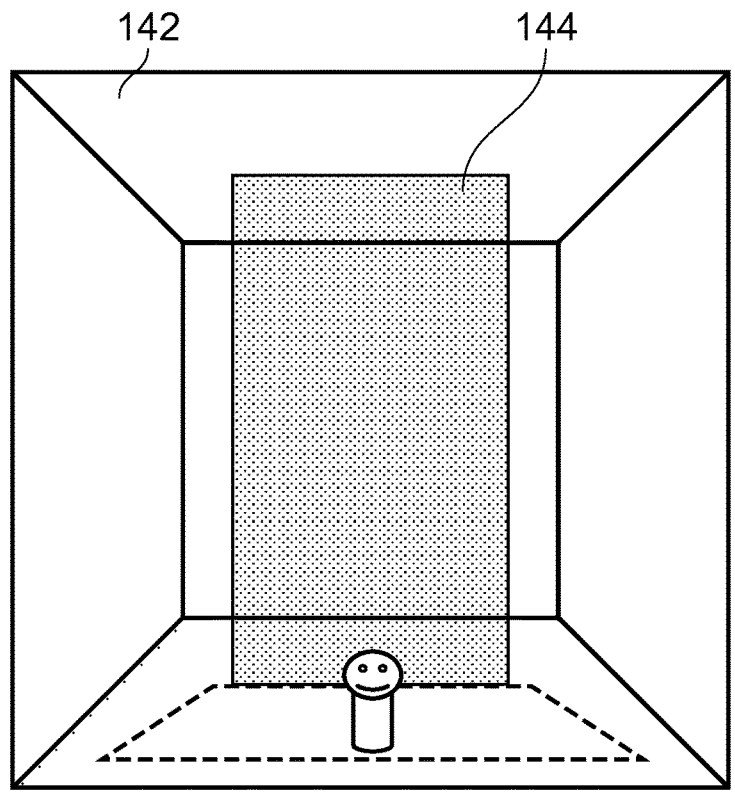
Figure 7C:
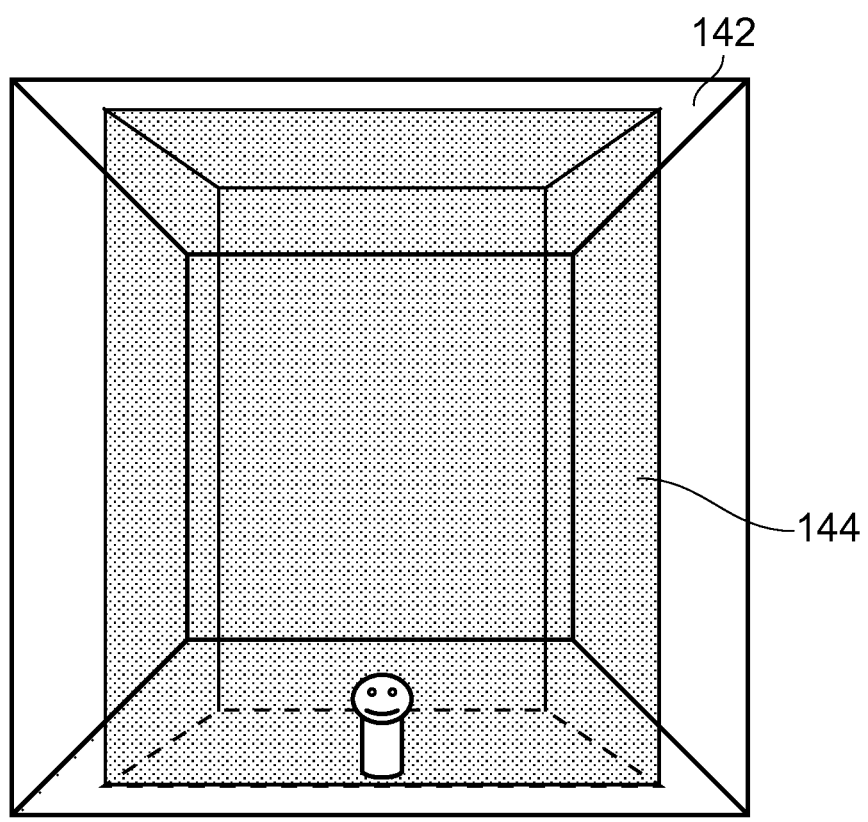
Figure 8:
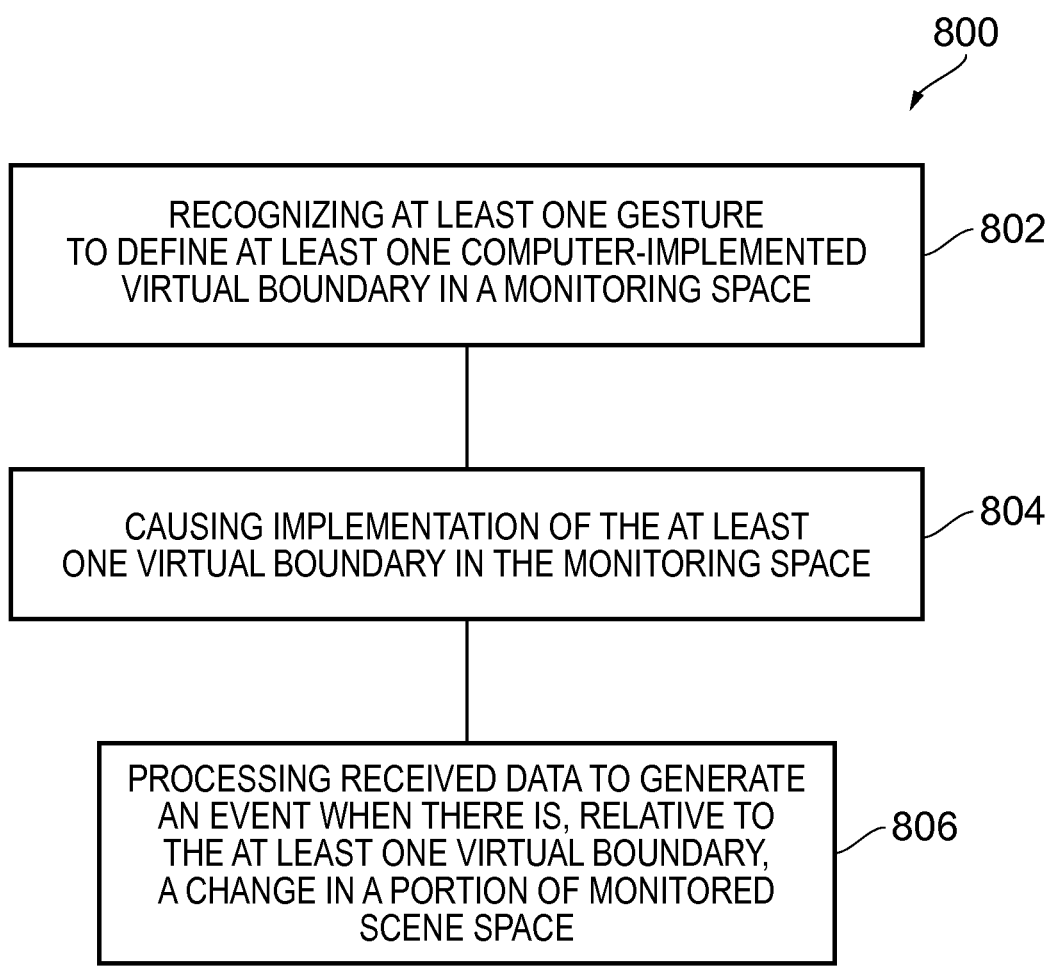
Figure 9:
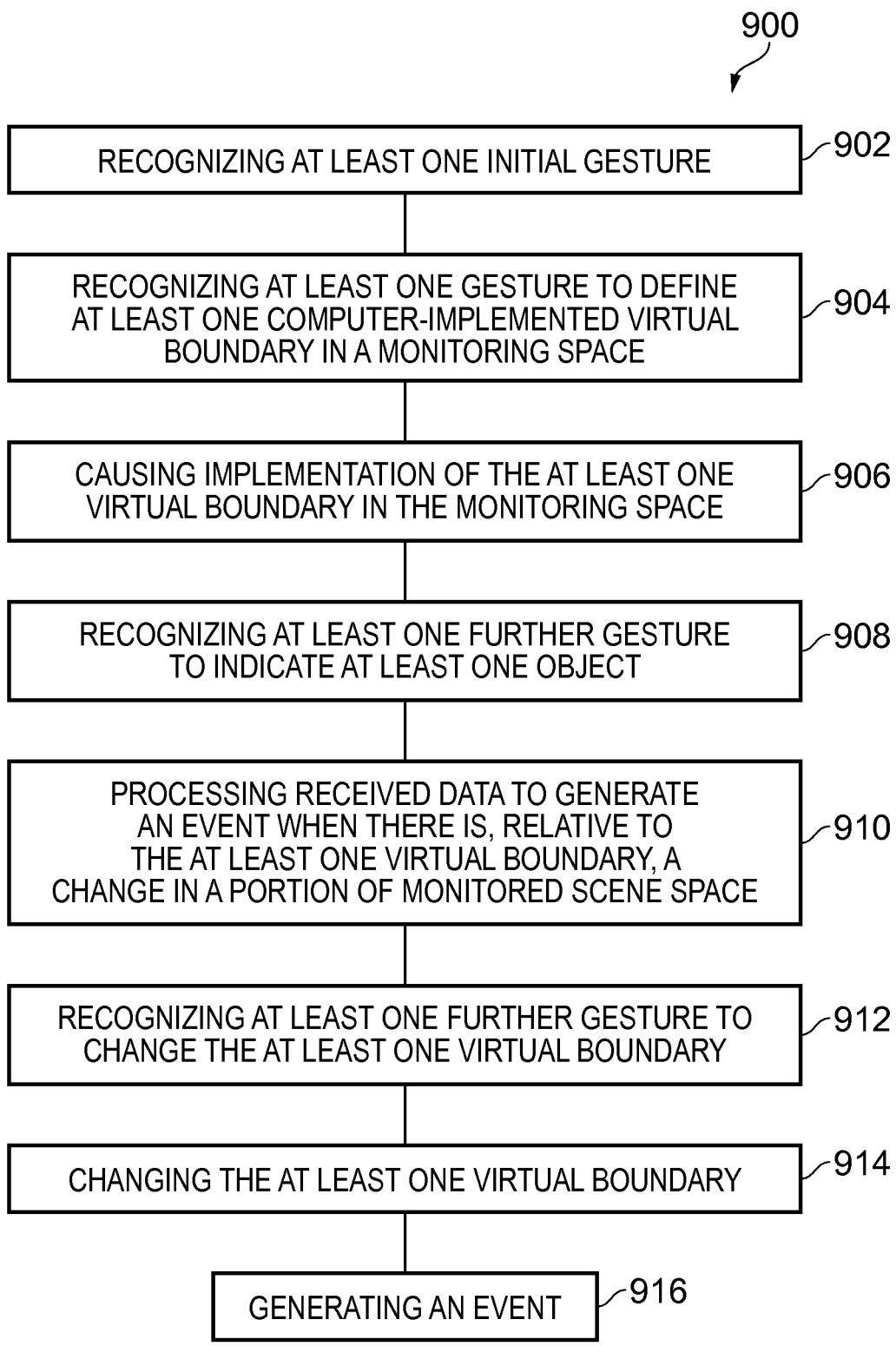

For a better understanding of various examples that are useful for understanding the brief description, reference will now be made by way of example only to the accompanying drawings in which:

FIG. 1 schematically illustrates an example of a system;
FIG. 2 illustrates an example of a state machine;
FIG. 3 illustrates an example of a processing module;
FIG. 4 illustrates an example of a delivery mechanism for a computer program;
FIG. 5 illustrates an example of operation of the system;
FIG. 6 illustrates an example of operation of the system;
FIGS. 7A-C illustrate an example of operation of the system;
FIG. 8 illustrates an example of a method; and
FIG. 9 illustrates an example of a method.

DETAILED DESCRIPTION

The system 100 described is a system that monitors at least one scene. The operation of the system can be controlled by a user within the scene by carrying out actions within the scene. For example, the user is able to control the system so that the user can define at least one virtual boundary to be monitored by the system.

FIG. 1 schematically illustrates a system 100 comprising: one or more sensors 110 configured to record sensor data 112 from a scene 140; a processing module 120 configured to process the sensor data 112 recorded from the scene 140 to recognise automatically events that occur in the scene 140 and to automatically take decisions as a consequence of the recognition; and a communication module 130 configured to communicate, when a decision to communicate is taken by the processing module 120.

Some but not necessarily all of the events that are recognised may relate to an object 152 or a particular object 152 in the scene 140. An object may be an inanimate object, an animal, a person or a particular person 150 in the scene 140. In some but not necessarily all examples of the system 100, the system 100 is a real-time recognition system and the automatic recognition and decision, if any, occur substantially at the same time as the sensor data 112 is recorded.

The system 100 may be used for surveillance, monitoring, assisted living, elderly care or other applications. The system 100 may be used in businesses, public areas or at home. One expected use is as a home surveillance system.

The system 100 may enable a user to control monitoring, for example, when the user is a person 150 in the scene 140. The system 100 may enable a user to control recognition and/or a consequence of recognition, for example, when the user is a person 150 in the scene 140.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording, Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, the sensors 110 are fixed in space relative to the scene space 140. In other examples, the sensors 110 are movable or moving relative to the scene space 140.

In some, but not necessarily all embodiments, the sensors 110 are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is viewed from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement such as a microphone array so that the scene 140 is sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the scene 140 with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing the person 150 or object 152 to be sensed are passive and merely reflect incident light or sound waves emitted by a transmitter. However, 'active' examples, which require activity at the sensed object, may additionally or alternatively be used. As an example, a person 150 may carry a positioning apparatus that is configured to position the positioning apparatus within the scene space 140. The positioning apparatus may for example measure motion of the positioning apparatus from a reference position using accelerometers. Gyroscopes may optionally be used to determine orientation. Additionally or alternatively, the positioning apparatus may enable positioning via triangulation (trilateration) by transmitting to multiple receivers and/or receiving from multiple transmitters.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the decision (or control) sub-module 128 may be performed by the same circuitry or under the control of the same computer program. Alternatively one or more of the processing sub-module 124, the recognition sub-module 126, and the decision (or control) sub-module 128 may be performed by dedicated circuitry or a dedicated computer program. The sub-modules may be performed using software, dedicated hardware or a mix of programmed hardware and software.

The memory sub-module 122 may be used to store unprocessed sensor data 110 and/or processed sensor data 110 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114. The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:

use machine (computer) vision to perform one or more of:
detect a (moving or stationary) object or person,
classify a (moving or stationary) object or person, and/or
track a (moving or stationary) object or person;
use spatial analysis to perform one or more of:
position a (moving or stationary) object in the scene space using depth determination; and/or
create a map of the scene space; and/or
use behaviour analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behaviour.

Object tracking may be achieved by labelling objects and recording the position in the scene 140 of the labelled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The system may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behaviour analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognise a putative symbol encoding an event in the scene 140 as a meaningful symbol associated with a particular meaning.

The recognition sub-module 126 may be configured to recognize a putative symbol, defined in terms of parameters determined from the machine (computer) vision analysis and/or the spatial analysis, and produced by the processing sub-module 124 as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised learning, to recognise meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 128 performs a response action.

In some but not necessarily all examples the action performed may be programmed by a user. In some but not necessarily all examples the programming may occur via motion of the user within the scene. Examples of actions performed may be the generation of an alert or notification.

The alert or notification may be provided via the communications module 130. The communications module 130 may communicate wirelessly, via radio waves or via a wired connection to a local or remote apparatus. Examples of such apparatus include but are not limited to displays, televisions, audio output apparatus, personal devices such as mobile telephone or personal computers, a projector or other user output apparatus.

b) If the putative symbol is similar to a user control symbol, the meaningful event is a 'user control' event, and the control sub-module 126 enables user control of monitoring and/or user control of the response.

For example, a user may be able to program or teach a meaningful response symbol that is added to the database of reference symbols. In some but not necessarily all examples the programming may occur via motion of the user within the scene 140.

For example, a user may be able to program or teach an action performed when the putative symbol is matched to a response symbol. Examples of actions performed may be the generation of an alert or notification.

The operation of the processing module 120 may be further understood from FIG. 2 which illustrates a state machine 200 for the processing module 120. The state machine 200 has a monitoring state 210, a user control state 220 and an automatic response state 230.

In the monitoring state 210, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 126 responds automatically depending on the event. If the meaningful event is a 'response' event, then the state machine 200 transitions to the response state 230 and the control sub-module 126 performs a response action. If the event is a 'user control' event, then the state machine 200 transitions to the user control state 220 and user control of monitoring and/or response is enabled.

A particular gesture user input may be used as a 'user control' event. A gesture user input is a gesture that has meaning to the system 100 as a user input. A gesture may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors 110. The body part may comprise the user's hand or part of the user's hand such as one or more fingers and thumbs. In other examples, the user input object may comprise a different part of the body of the user such as their head or arm. Three-dimensional movement may comprise motion of the user input object in any three orthogonal directions. The motion may comprise the user input object moving towards or away from the sensors 110 as well as moving in a plane parallel to the sensors or any combination of such motion. A gesture may be a non-contact gesture. A non-contact gesture does not contact the apparatus sensors at any time during the gesture. A gesture may be an absolute gesture that is defined in terms of an absolute displacement from the sensors 110. Such a gesture may be tethered, in that it is performed at a precise location in the scene space. Alternatively a gesture may be a relative gesture that is defined in terms of relative displacement during the gesture. Such a gesture may be un-tethered, in that it need not be performed at a precise location relative in the scene space and may be performed at a large number of arbitrary locations. A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt. A gesture may be performed in one spatial dimension (1D gesture), two spatial dimensions (2D gesture) or three spatial dimensions (3D gesture).

In some examples, the system 100 may track one or more objects and/or points in relation to a person's body in gesture recognition. For example, the system 100 may perform full skeletal tracking of a person's body in gesture recognition.

Implementation of the processor (or processing) module 120 or part of the processor module 120 may be as controller circuitry. The controller circuitry (or processing module) 120 may be implemented in hardware alone, have certain aspects in software including firmware alone or can be a combination of hardware and software (including firmware).

As illustrated in FIG. 3 the controller (or processing module) 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed with reference to FIGS. 1 and/or 2 and/or 8 and/or 9. The processor 310 by reading the memory 320 is able to load and execute the computer program 322.

The system 100 may therefore comprise an apparatus (or processing module) 120 that comprises:

at least one processor 310; and at least one memory 320 including computer program code 322 the at least one memory 320 and the computer program code 322 configured to, with the at least one processor 310, cause the apparatus (or processing module) 120 at least to perform one or more of blocks 124, 126, 128 of FIG. 1 and/or one or more of the blocks of FIGS. 8 and/or 9.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322. The apparatus (or processing module) 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks 124, 126, 128 illustrated in the FIG. 1 and/or the blocks illustrated in FIGS. 8 and/or 9 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

FIG. 5 illustrates an example of operation of the system 100. Part a in the example of FIG. 5 illustrates a scene 140. The scene 140 is a real-world scene. The scene 140 comprises a three-dimensional space and may therefore be considered a scene space 140. The scene space 140 is monitored by the system 100. The scene space may therefore be considered a monitored scene space 140. In the example of FIG. 5 the monitored scene space 140 is a room comprising four walls, a ceiling and a floor.

In some examples the monitored scene space 140 may comprise no boundaries. Additionally or alternatively in examples the monitored scene space 140 may comprise a plurality of rooms that may or may not be spatially connected.

In the example of FIG. 5 a person 150 is standing in the monitored scene space 140. The person 150 is performing at least one gesture user input 146 to define at least one computer-implemented virtual boundary 144. The gesture user input 146 may be referred to as a gesture 146 and may be as described above with reference to FIG. 2. The gesture 146 may be considered a boundary indication gesture 146.

In the illustrated example the person 150 is performing a gesture 146 to define a single computer-implemented virtual boundary 144.

The gesture 146 comprises a motion along a path 148 at a location in the monitored scene space 140. In the example of FIG. 5 the gesture 146 comprises the person 150 moving an object 152 in his hand along a path 148. In the example the path 148 is a straight line across the monitored scene space 140.

In examples, the path 148 may comprise any motion in one spatial dimension, two spatial dimensions or three spatial dimensions and may take any form.

Part c of the example of FIG. 5 illustrates an overhead view of the monitored scene space 140 in which the person 150 is illustrated making the gesture 146 to define a computer-implemented virtual boundary 144.

As can be seen in parts a and c of the example of FIG. 5, the gesture 146 starts at a position having coordinates (x, y, z) in the scene 140 where x is measured from the left wall, y is measured from the front wall and z is measured from the floor. The gesture 146 ends at a finishing position having coordinates (x', y' and z') (not illustrated in FIG. 5).

In the example of FIG. 5 the gesture 146 comprises the person 150 moving the object 152 from the starting position (x, y, z) along a path 148 which is a straight line across the monitored scene space 140.

In the illustrated example the gesture 146 comprises motion in one spatial dimension as the value of x changes along the path 148 and the values of y and z remain constant.

In other examples the values of x, y and/or z may vary in any way along the path 148 from any starting position in the monitored scene space 140.

Parts b and d of the example of FIG. 5 illustrate a monitoring space 142. The monitoring space 142 comprises a virtual representation of the monitored scene space 140 created and used by the system 100. The monitoring space 142 may be formed, for example, from data received by the sensors 110, such as received image data and/or depth data.

Parts b and d illustrate respectively the same views as illustrated in parts a and c of FIG. 5.

In some examples the system 100 may use information of the geometry of the monitored scene space 140 to form the monitoring space 142. For example, the system 100 may use a three dimensional model of the monitored scene space 140 in the formation of the monitoring space 142. The three dimensional model of the monitored scene space 140 may be created by the system 100 and/or may be received by the system 100. Methods for creating a three dimensional model of the monitored scene space 140 are known in the art.

The system 100 may use the monitoring space 142 to monitor the scene space 140. For example, the system may use the monitoring space 142 to implement and monitor at least one virtual boundary 144.

As indicated by the arrows between parts a and b and parts c and d of FIG. 5 there is a correspondence between the monitoring space 142 and the monitored scene space 140.

In some examples there may be a one to one mapping between the monitoring space 142 and the monitored scene space 140.

In other examples there may be a scale invariant transformation between the monitored scene space 140 and the monitoring space 142.

The system 100 recognizes the gesture 146 performed by the person 150 and in response implements at least one virtual boundary 144 in the monitoring space 142. In some examples, recognizing the gesture 146 may comprise processing received data, such as image data. For example, the system 100 may analyze one or more video feeds.

In examples, at least part of the virtual boundary 144 is determined by the path 148 in the monitored scene space 140 and the at least part of the virtual boundary 144 is located in the monitoring space at a corresponding location equivalent to the location of the path 148 in the monitored scene space 140.

For example, at least part of the virtual boundary 144 may be implemented along the path 148 at a location in the monitoring space 142 equivalent to the location of the path 148 in the monitored scene space 140.

The gesture 146 may be an absolute gesture or tethered gesture as described above in relation to FIG. 2.

As illustrated in parts b and d, in the example of FIG. 5, the virtual boundary 144 is implemented from a point (x, y, z) in the monitoring space 142 along the path 144. The point (x, y, z) in the monitoring space is equivalent to point (x, y, z) in the monitored scene space 140.

The system 100 may extend the virtual boundary 144 beyond the path 148. The system 100 may use information of the geometry of the monitored scene space 140, such as a three dimensional model, to extend the virtual boundary 144.

In some examples, the system 100 may extend the virtual boundary 144 to at least one boundary in the monitoring space 142 corresponding to at least one physical boundary in the monitored scene space 140. For example, the system 100 may extend the virtual boundary 144 from a first wall to a second wall and/or from a floor to a ceiling (see FIG. 6).

In the example of FIG. 5, the dotted line in part d of the FIG. illustrates the extension of the virtual boundary 144 to the left and right boundaries of the monitoring space 142 corresponding to the left and right walls of the monitored scene space 140.

In some examples a user may indicate a path 148 comprising part of a virtual boundary enclosing an area and the system 100 may automatically complete the virtual boundary 144 enclosing the area. For example, a user may draw a path 148 that is and/or comprises a portion of a shape and the system 100 may complete the shape when implementing the virtual boundary 144.

As an example, a user may draw a path that is a semi-circle and the system 100 may automatically extend the virtual boundary 144 to comprise the complete circle.

In some examples a user may indicate to the system 100 that the virtual boundary 144 should be extended to complete a boundary enclosing an area using a gesture 146 and/or one or more other inputs.

In some examples the system 100 may infer from a drawn path 148 that a virtual boundary 144 should be extended to enclose an area and may extend the virtual boundary 144 automatically.

The system 100 may provide feedback to a user to confirm that the system 100 has recognized the gesture 146 and has implemented the virtual boundary 144. The feedback may comprise any suitable feedback, for example audio and/or visual and/or tactile feedback and so on. Additionally or alternatively the system 100 may send one or more messages to a device or devices to inform the user that the system 100 has implemented the virtual boundary 144.

The system 100, may process received data to generate a response event when there is, relative to the at least one virtual boundary 144, a change in a portion of the monitored scene space 140. For example, the system 100 may process data received by the sensors 110, such as audio and/or image data, to generate the response event. The system may analyze one or more audio and/or video feeds to generate the response event. In some examples processing the received data to generate the response event may be considered monitoring the virtual boundary 144.

In examples the same sensor, such as a camera, may be used in recognition of the gesture 146 defining the at least one virtual boundary 144 and for monitoring the at least one virtual boundary 144.

In some examples, processing received data to generate the response event may comprise processing received data to monitor the virtual boundary 144 to detect activity across the virtual boundary 144 and/or activity within a threshold of the virtual boundary 144. For example, the system 100 may process audio and/or image and/or depth data to monitor the virtual boundary 144 to detect activity across the virtual boundary 144 or within a threshold of the virtual boundary 144.

The system 100 may allow a user to verify that the one or more virtual boundaries 144 have been implemented without generating a response event.

For example, the a user may define a virtual boundary 144 using a gesture 146 at a location in the monitored scene space 140 and may then interact with the location in the monitored scene space 140 to verify that the virtual boundary 144 is "in place". In examples the user may move at least a part of his body, such as his hand, through the location in the monitored scene space and the system 100 may provide feedback to confirm that the user has touched and/or crossed the virtual boundary 144. Any suitable feedback may be provided, for example, audio and/or visual and/or tactile feedback. Additionally or alternatively the system 100 may send at least one message to a device or devices of the user.

In examples the system 100 may begin to process received data to generate the response event after the user has verified the virtual boundary 144. For example, the system 100 will not generate an alert and/or increment a counter until after the user has verified the virtual boundary 144.

The response event may comprise providing feedback, for example using the communication module 130. In some examples the feedback may comprise one or more alerts. The one or more alerts may comprise any form of alert such as audio and/or visual alerts. Additionally or alternatively, the feedback may comprise providing one or more messages to an apparatus such as a mobile telephone, tablet, laptop computer, desktop computer and so on.

In some examples, the response event may additionally or alternatively comprise incrementing a counter. For example, the system 100 may monitor the number of times there is a boundary interaction such as an object 152 touching and/or crossing and/or approaching within a threshold of the virtual boundary 144. In addition or alternatively the system 100 may monitor the direction of boundary interactions, such as the direction of boundary crossings. The system 100 may be configured to provide statistics on boundary interactions.

In some examples the system 100 may be used to monitor how often an elderly person goes to the bathroom and/or medicine cabinet, how often a child or children access or go near a refrigerator, monitoring people in a public space and so on.

A user of the system 100, such as person 150, may configure the response event. For example, a user may perform one or more additional gestures 146 that are recognized by the system 100 to configure the response event. In addition or alternatively the user may provide input to the system 100 to configure the response event using a device such as a tablet or mobile phone.

The system 100, in some examples, may process received data to generate a response event when there is, relative to the virtual boundary 144, a change in a portion of the monitored scene space 140 in relation to any object 152. For example, the system may generate a response event when any object 152 crosses, touches and/or comes within a threshold of the virtual boundary 144. Such virtual boundaries 144 may be considered general virtual boundaries 144.

In other examples, the system may process received data to generate a response event when there is, relative to the virtual boundary 144, a change in a portion of the monitored scene space 140 in relation to one or more user specified objects 152.

For example, after performing the gesture 146 to define at least one virtual boundary 144, a user 150 of the system 100 may perform a gesture 146 to indicate to the system 100 one or more objects 152. For example, the user 150 may point to the one or more objects 152 using his hand or a mobile device and/or may position the object or objects in a viewfinder of a device.

In other examples, the gesture 146 indicating the one or more objects may be performed before the gesture 146 defining the virtual boundary 144.

The system 100 may recognize the gesture 146 indicating the one or more objects 152 and in response the system 100 may generate a response event only when there is a change in a portion of the monitored scene space 140, relative to the virtual boundary 144, in relation to the indicated objects 152. For example, the system 100 may generate a response event only when one of the indicated objects 152 crosses, touches and/or comes within a threshold of the virtual boundary 144. Such virtual boundaries 144 may be considered object specific virtual boundaries.

With reference to the example of FIG. 5, the person 150 may perform the gesture 146 to define the virtual boundary 144 and the system 100 may recognize the gesture 144 and implement the virtual boundary 144.

The person 150 may then perform a further gesture, such as pointing to himself. The system recognizes the further gesture and monitors the virtual boundary 144 only in relation to the person 150. For example, the system 100 may generate a response event such as an alert and/or increment a counter when the person 150 crosses, touches and/or comes within a threshold of the virtual boundary 144 but not when any other object 150 crosses, touches and/or comes within threshold of the virtual boundary 144.

In some examples, a user, such as the person 150, may perform an initial gesture 146 to allow the gesture 146 to define at least one computer-implemented virtual boundary to be recognized by the system 100.

For example, the person 150 may perform a gesture 146 to place the system 100 in the user control state 220 to allow the user to perform the boundary indication gesture 146. In some examples, the gesture 146 to place the system 100 in the user control state may be/comprise a hand clap detected by audio, and/or a gesture 146 which can be detected using depth data.

In examples, the system 100 recognizes the initial gesture 146 and goes into a boundary recognition mode ready to recognize one or more boundary indication gestures. For example, a user, such as person 150, may point to a camera of system 100, to indicate that he is going to perform a boundary indication gesture 146. The system 100 may provide feedback, such as audio or visual feedback, to the user to confirm that the system 100 is in boundary indication mode.

In some examples, the user may then perform a gesture 146 to define at least one computer-implemented virtual boundary 144.

After one or more virtual boundaries 144 have been implemented a user, such as person 150, may perform a gesture 146 to change the one or more virtual boundaries 144. Additionally or alternatively a user may provide input to change the virtual boundary using a mobile device.

The system 100 may recognize the gesture 146 and in response may change the one or more virtual boundaries 144. Any characteristic of a virtual boundary 144 may be changed in this way. For example a user may perform a gesture 146 to change one or more of the location, shape, size, height of the virtual boundary and so on. In examples there may be any number of different gestures 146 to change the virtual boundary 144.

The change may be temporary and the system 100 may revert the virtual boundary 144 to its original state after a time. The amount of time may be predefined or may be configured by a user, for example using a gesture and/or one or more other inputs.

In the example of FIG. 5, after the user has performed the gesture 146 to define the virtual boundary 144, and the system has implemented the virtual boundary 144, the user may make a grabbing motion in the vicinity of the monitored scene space 140 corresponding to the location of the virtual boundary 146 in the monitoring space 142. In the example of FIG. 5 the person 150 may "grab" at the space through which the path 148 was drawn.

In some examples, the system 100 may be equipped with one or more projectors and/or lasers configured to project the virtual boundary 144 in the monitored scene space 140 using augmented reality techniques. Additionally or alternatively the user may observe the virtual boundary using augmented reality on one or more devices such as glasses.

The system 100 recognizes the grabbing gesture and its location proximate to the virtual boundary 144 and moves the virtual boundary in the monitoring space 142 in correspondence with the movement of the person's hands in the monitored scene space 140 while the person continues to grab. When the person 150 releases the "grab" gesture the system 100 implements the virtual boundary 144 at the new location.

In some examples a user may change a virtual boundary 144 to temporarily allow for boundary interaction(s) such as approaching, touching and/or crossing of the virtual boundary 144 without generating the response event. This may be done using a gesture 146 and/or one or more additional inputs.

In some examples a user, such as person 150, may perform a gesture 146 and the system 100 recognizes the gesture 146. In response the system 100 temporarily allows for one or more objects 152, such as person 150, to approach, touch and/or cross the virtual boundary without generating a response event. In examples, the change may be spatially temporary and the system 100 may allow a number of approaches/touches/crossings of the virtual boundary without generating the response event. The number of approaches/touches/crossings may be predefined or may be configured by a user, for example using a gesture 146 and/or one or more other inputs.

In examples the change may temporally limited and the system 100 may allow approaching, touching and/or crossing of the virtual boundary 144 for an amount of time. In examples the amount of time may be predefined or may be configured by a user, for example using a gesture 146 and/or one or more other inputs.

In some examples, a gesture 146 such as a gesture 146 to change a virtual boundary 144 may be spatially restricted. For example, the system 100 may only recognize such a gesture 146 if it is performed in a predefined area of the monitored scene space. In examples the system 100 will recognize a gesture 146 to change a virtual boundary 144 only if it is performed above a certain height (at a location having a z value above a threshold) to prevent children, for example, from changing a virtual boundary 144.

Additionally and/or alternatively a gesture 146, such as a gesture 146 to change a virtual boundary 144 may be recognized by the system 100 only when performed by a certain person/people. The person/people authorized to make a particular gesture 146 may be indicated to the system 100 using a gesture and/or one or more additional inputs. For example a user may point at the authorized person/people and/or point a mobile device at the authorized person/people and/or position the authorized person/people in a viewfinder of a device.

For example, in FIG. 5, after defining the virtual boundary 144 the person 150 may use his finger to draw a circle around his face to indicate to the system 100 that only he is allowed to change the virtual boundary 144.

In some examples a virtual boundary 144 may be conditionally monitored and/or conditionally enabled/disabled. For example, the system 100 may process received data to generate a response event when there is, relative to the virtual boundary 144, a change in a portion of the monitored scene space 140 when one or more criteria are satisfied but does not process received data to generate the response event otherwise.

The criteria may be predefined and/or may be configured by a user using a gesture and/or one or more additional inputs.

In examples any criterion/criteria may be used. For example, any temporal and/or physical criteria may be used. In examples, a virtual boundary 144 may be conditionally monitored dependent upon time of day and/or day of week and/or week of month and/or month of year and/or independence upon the presence of one or more objects 152 in the monitored scene space 140.

For example, in FIG. 5 after defining the virtual boundary 144 the person 150 may perform a gesture 146 to indicate to the system 100 that the virtual boundary 144 should be monitored only when he is not in the monitored scene space 140.

The system 100 recognizes the gesture 146 and subsequently monitors the virtual boundary 144 only when the person 150 is not in the monitored scene space 140.

In some examples the virtual boundary may be monitored when the person 150 leaves the scene space 140 and may be permanently removed when he returns to the scene space 140.

In other examples the virtual boundary 144 may be stored by the system 100 and enabled every time the person 150 leaves the monitored scene space 140 and disabled every time he returns to the monitored scene space 140. Any number of virtual boundaries 144 may be stored by the system 100.

FIG. 6 illustrates an example of operation of the system 100.

FIG. 6 illustrates an example of a monitoring space 142 corresponding to the monitored scene space 140 illustrated in FIG. 5. In the example of FIG. 6 a person 150 has performed a gesture 146 to define a virtual boundary 144, the gesture 146 comprising motion along the path 148.

In FIG. 6 the system 100 has recognized the gesture 146 and has implemented a virtual boundary 144. In FIG. 6 the system has extended the virtual boundary 144 across the monitoring space 142 from wall to wall and ceiling to floor in the corresponding monitored scene space 140.

The system 100 may make use of knowledge of the geometry of the monitored scene space 140 to extend the virtual boundary 144. For example the system may make use of a three dimensional model of the monitored scene space 140 to extend the virtual boundary 144.

The extension of the virtual boundary 144 may be optional and/or configurable by a user, such as person 150. In some examples the system 100 may by default extend the virtual boundary 144 defined by a gesture 146 by a predefined amount or from ceiling to floor and/or from wall to wall.

In other examples the user may provide additional input to the system 100 to extend the virtual boundary 144. For example, after performing a gesture 146 to define a virtual boundary 144 the user may perform at least one further gesture 146 to indicate to the system 100 whether the virtual boundary 144 should be extended and if so how the virtual boundary 144 should be extended.

In such examples the virtual boundary 144 may be visualized to the user on the screen of a device, such as a mobile phone, as a graphical rendering and/or as an augmented reality view allowing the user to view the monitored scene space 140 through the device with the virtual boundary 144 rendered in the augmented reality view on top of live video of the monitored scene space 140. In some examples the device may comprise glasses worn by a user.

Additionally or alternatively the virtual boundary 144 may be projected on the walls and/or floor and/or ceiling of the monitored scene space 140 using one or more projectors and/or lasers.

For example, a user may perform a first gesture 146 to indicate that the virtual boundary 144 should be extended wall to wall and/or a second gesture 146 to indicate that the virtual boundary should be extended floor to ceiling. The system 100 may recognize the gestures 146 and extend the virtual boundary 144 accordingly.

In some examples the system may infer from the gesture 146 used to define the virtual boundary 144 how the virtual boundary 144 should be extended. For example, if a user performs a gesture 146 around an object 152 and/or enclosing a space, the system 100 may infer that only extension from floor to ceiling is appropriate. See FIGS. 7A-C.

FIGS. 7A-C illustrate an example of operation of the system 100.

FIG. 7A illustrates another example of a monitored scene space 140. In FIG. 7A there is a child 152 in the monitored scene space 140 and a user has performed a gesture 146 comprising a path 148 around the child 152. In the example of FIG. 7A the path 148 comprises a rectangle enclosing the child 152.

FIG. 7B illustrates the monitoring space 142 corresponding to the monitored scene space illustrated in the example of FIG. 7A.

In FIG. 7B the system 100 has recognized the gesture 146 and has implemented a virtual boundary 144 as defined by the gesture 146. In the example of FIG. 7B the system 100 has extended the virtual boundary 144 from floor to ceiling. Only the back section of the virtual boundary 144 is illustrated in the example of FIG. 7B to more clearly highlight the extension from floor to ceiling.

FIG. 7C illustrates the monitoring space 142 with the entire extended virtual boundary 144 around the child 152 illustrated.

The virtual boundary 144 in the example of FIGS. 7A-C is an object specific boundary in relation to the child 152. In this example the system is configured to generate an alert if the child 152 crosses the virtual boundary 144 but not if any other object crosses the boundary 144.

In some examples a virtual boundary 144 may be fixed in position as defined by the gesture 146 used to define the virtual boundary 144. Such virtual boundaries 144 may be considered fixed virtual boundaries.

With regard to the example of FIGS. 7A-C the virtual boundary 144 around the child 152 may be fixed and may not move unless moved by a user.

In other examples the system 100 may be configured to move a virtual boundary in relation to one or more objects 152 that may be indicated to the system as described above in relation to FIG. 5. A user may indicate to the system 100 the a virtual boundary 144 should move in relation to one or more objects 152 using one or more gestures 146 and/or one or more other inputs.

Such virtual boundaries 144 may be considered moving virtual boundaries.

With regard to the example of FIGS. 7A-C the system 100 may move the virtual boundary 100 as the child 152 moves. In some examples, the system 100 may automatically center a moving virtual boundary 144 on an indicated object 152.

A moving virtual boundary 144 may, for example, be used to ensure that two objects 152 do not come within a certain distance of each other and/or the distance between two objects 152 does not exceed a threshold.

In the example of FIGS. 7A-C a user may indicate to the system 100 that an older sibling (not illustrated) may not cross the virtual boundary 144 around the child 152. In examples where the virtual boundary 144 around the child 152 is a moving virtual boundary that follows the movement of the child 152 this ensures a minimum distance between the child 152 and the older sibling. If the older sibling crosses the virtual boundary 144 the user may be alerted.

Additionally/alternatively, if the older sibling is within the virtual boundary 144 when it is defined by the user the moving virtual boundary 144 the virtual boundary 144 defines the maximum distance that can exist between the two objects (child and older sibling). If the older sibling crosses the virtual boundary the system 100 may alert the user.

In some examples a user, such as person 150, may indicate that a moving virtual boundary 144 should be formed around an object 152, such as child 152, by indicating the child 152 and then indicating the distance of the virtual boundary 144 around the child 152 using his hands.

In some examples the distance may exceed the arm span of the user. In such examples the user may hold his arms outstretched to the sides and the system 100 may start to indicate the virtual boundary distance using one or more projectors and/or lasers to provide a distance indication to the user. The system 100 moves the indication along the user's arms and beyond. When the user is happy with the distance he may bring his hands together, for example, or provide some other gesture to set the distance.

In some examples the system 100 after a virtual boundary 144 has been indicated, such as the one in the example of FIGS. 7A-C, the system 100 may stream video from inside the virtual boundary 144 or in the vicinity of the boundary 144. In some examples a user may view the streamed video on a device, such as a mobile device.

In some examples, generating a response event may comprise streaming video and/or still images comprising and/or focused on the location where the boundary interaction occurred to a user's device such as a mobile device.

In examples a user may define a virtual boundary 144 inside which the system 100 is to monitor sounds. The user may indicate this to the system 100 using one or more gestures 146 and/or one or more other inputs.

The system 100 may recognize the gesture 146 and monitor the area inside the virtual boundary 144 for sounds. The system 100 may, for example, generate a response event if a sound is detected coming from the area within the virtual boundary 144.

In some examples, the system 100 may only monitor for sounds above a defined threshold.

For example, in the example of FIG. 7A-C the system 100 may monitor the area inside the virtual boundary 144 for sounds. The system may therefore act as an ad-hoc baby monitoring system. In some examples, the system 100 may monitor for sounds of a certain type, such as sounds from a person and/or animal sounds and so on. In some examples a user may configure the sounds to be monitored using one or more gestures 146 and/or one or more additional inputs.

In examples a user may view the one or more virtual boundaries 144 using augmented reality. For example, the user may view the virtual boundary 144 using smart glasses and/or viewfinder based augmented reality mechanisms.

In examples, the virtual boundary, when viewed using augmented reality, may comprise an indication of the object or objects 152 to which the virtual boundary 144 applies. The indication may be any suitable indication and may comprise text and/or image(s).

For example, in the example of FIGS. 7A-C the virtual boundary 144 viewed using augmented reality may include a semi-transparent overlay of the child 152.

FIG. 8 illustrates an example of a method 800. The method 800 may be performed by the system 100.

At block 802 at least one gesture 146 to define at least one computer-implemented virtual boundary 144 in a monitoring space 142 is recognized. In some examples recognizing the at least one gesture 146 may comprise processing received image data and/or received depth data. The gesture 146 comprises a motion along a path 148 in a monitored scene space 140 and there is a correspondence between the monitoring space 142 and the monitored scene space 140.

In examples the gesture 146 may be as described above in relation to FIG. 2.

At block 804 implementation of the at least on virtual boundary 144 in the monitoring space 142 is caused. At least part of the virtual boundary 144 is determined by the path 148 in the monitored scene space 140 and the at least part of the virtual boundary 144 is located in the monitoring space 142 at a corresponding location equivalent to the path location.

In examples implementing the virtual boundary 144 may comprise extending the virtual boundary 144. For example, the system 100 may extend the virtual boundary 144 to at least one boundary in the monitoring space 142 corresponding to at least one physical boundary in the monitored scene space 140.

At block 806 received data is processed to generate a response event when there is, relative to the at least one virtual boundary 144, a change in a portion of the monitored scene space 140.

FIG. 9 illustrates an example of a method 900. The method 900 may be performed by the system 100. In some examples one or more of the blocks of FIG. 9 may be omitted.

At block 902 at least one initial gesture 146 is recognized. The at least one initial gesture 146 may allow the at least one gesture 146 to define a virtual boundary 146 to be recognized.

For example, the at least one initial gesture 146 may cause the system to enter a boundary recognition mode.

Blocks 904 and 906 are the same as blocks 802 and 804 in FIG. 8.

At block 908 at least one further gesture 146 is recognized to indicate at least one object 152. For example, the at least one further gesture 146 may indicate one or more objects 152 to monitor in relation to the one or more virtual boundaries 144.

Block 910 may be the same as block 806. However, in examples where block 908 is performed the system 100 may, at block 910, process received data to generate a response event when there is, in relation to the at least one virtual boundary, a change in a portion of the monitored scene space 140 in relation to the at least one indicated object 152.

In examples the system 100 may process received data to monitor the at least one indicated object 152 in relation to the at least one virtual boundary 144.

At block 912 at least one further gesture 146 is recognized to change the at least one virtual boundary 144.

At block 914 the at least one virtual boundary is changed in response to the at least one further gesture 146 recognized in block 910. For example, the at least one virtual boundary 144 may be moved, resized, changed in shape, cancelled and so on.

At block 916 a response event is generated. For example an alert may be provided and/or a counter incremented.

Where a structural feature has been described, it may be replaced by means for performing one or more of the functions of the structural feature whether that function or those functions are explicitly or implicitly described.

Examples of the disclosure provide for an easy and intuitive way to define and manipulate virtual boundaries for a surveillance system.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . ." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   recognizing at least one gesture to define at least one computer-implemented virtual boundary in a monitoring space, wherein the at least one gesture comprises a motion along a path and at a location in a monitored scene space, wherein there is a correspondence between the monitoring space and the monitored scene space;
   causing implementation of the at least one virtual boundary in the monitoring space corresponding to the monitored scene space, wherein at least part of the at least one virtual boundary is determined with the path in the monitored scene space and the at least part of the at least one virtual boundary is located in the monitoring space at a corresponding location equivalent to the path location;
   recognizing at least one user interaction with the location in the monitored scene space, wherein the at least one user interaction is configured to cause feedback regarding whether the at least one virtual boundary has been implemented, wherein the at least one user interaction comprises a user crossing through the location, wherein the at least one gesture is different from the at least one user interaction;
   in response to recognizing the at least one user interaction, providing the feedback, without generating a response event configured to indicate a change in a portion of the monitored scene space, to confirm that the at least one virtual boundary is implemented at least at the location in the monitored scene space; and
   after the feedback has been provided, processing received scene data to generate the response event when there is, relative to the at least one virtual boundary, the change in the portion of the monitored scene space.

2. A method as claimed in claim 1, wherein recognizing the at least one gesture comprises processing at least one of:
   received image data or
   received depth data.

3. A method as claimed in claim 1, further comprising recognizing at least one initial gesture that is different from the at least one gesture to avow the at least one gesture to be recognized.

4. A method as claimed in claim 1 further comprising extending one or more of the at least one virtual boundary to at least one boundary in the monitoring space corresponding to at least one physical boundary in the monitored scene space.

5. A method as claimed in claim 4 wherein extending the one or more of the at least one virtual boundary comprises at least one of:
   extending the one or more of the at least one virtual boundary from a first wall to a second wall or
   extending the one or more of the at least one virtual boundary from a floor to a ceiling.

6. A method as claimed in claim 1, wherein recognizing the at least one gesture comprises tracking motion of an object.

7. A method as claimed in claim 6, wherein recognizing the at least one gesture comprises tracking motion of at least part of a person's body, in the monitored scene space.

8. A method as claimed in claim 7 wherein the motion of the at least part of the person's body comprises the person walking along the path in the monitored scene space.

9. A method as claimed in claim 1 further comprising recognizing at least one additional gesture to indicate at least one object and in response to recognizing the at least one additional gesture, processing the received scene data to monitor the at least one object in relation to the at least one virtual boundary.

10. A method as claimed in claim 1, wherein processing the received scene data to generate the response event comprises processing image data to monitor the at least one virtual boundary to detect at least one of:
    activity across the at least one virtual boundary or
    activity within a threshold of the at least one virtual boundary.

11. A method as claimed in claim 10 wherein the response event comprises causing feedback to be provided in response to detecting at least one of:
    activity across the at least one virtual boundary or
    activity within the threshold of the at least one virtual boundary.

12. A method as claimed in claim 1 wherein processing the received scene data to generate the response event is performed where at least one condition is satisfied and is not performed where the at least one condition is not satisfied.

13. A method as claimed in claim 1, wherein recognizing the at least one gesture comprises processing received depth data, wherein the received depth data comprises depth data from passive and active depth sensing.

14. A method as claimed in claim 1, wherein the received scene data comprises audio data and wherein the processing of the received scene data to generate the response event comprises determining positioning of audio within the monitored scene space based on, at least in part, three-dimensional spatial audio processing.

15. A method as claimed in claim 1, further comprising: recognizing at least one further gesture performed by an authorized person and, in response to recognizing the at least one further gesture performed by the authorized person, disabling the processing of the received scene data so as to temporarily allow one or more interactions with the at least one virtual boundary without generating the response event.

16. A method as claimed in claim 15, wherein the temporarily allowing of the one or more interactions with the at least one virtual boundary without generating the response event comprises generating an event other than the response event when there is, relative to the at least one virtual boundary, the change in the portion of the monitored scene space.

17. A method as claimed in claim 1, wherein the processing of the received scene data to generate the response event is triggered when a user is outside of the monitored scene space.

18. An apparatus comprising:
at least one processor; and
at least one non-transitory memory including computer program code, the at least one memory and the computer program code configured to, with the at least one processor, cause the apparatus to perform at least the following:
recognize at least one gesture to define at least one computer-implemented virtual boundary in a monitoring space, wherein the at least one gesture comprises a motion along a path and at a location in a monitored scene space, wherein there is a correspondence between the monitoring space and the monitored scene space;
cause implementation of the at least one virtual boundary in the monitoring space corresponding to the monitored scene space, wherein at least part of the at least one virtual boundary is determined with the path in the monitored scene space and the at least part of the at least one virtual boundary is located in the monitoring space at a corresponding location equivalent to the path location;
recognize at least one user interaction with the location in the monitored scene space, wherein the at least one user interaction is configured to cause feedback regarding whether the at least one virtual boundary has been implemented, wherein the at least one user interaction comprises a user crossing through the location, wherein the at least one gesture is different from the at least one user interaction;
in response to recognizing the at least one user interaction, provide the feedback, without generating a response event configured to indicate a change in a portion of the monitored scene space, to confirm that the at least one virtual boundary is implemented at least at the location in the monitored scene space; and
after the feedback has been provided, process received scene data to generate the response event when there is, relative to the at least one virtual boundary, the change in the portion of the monitored scene space.

19. An apparatus as claimed in claim 18, wherein processing the received scene data to generate the response event comprises processing image data to monitor the at least one virtual boundary to detect at least one of:
activity across the at least one virtual boundary or
activity within a threshold of the at least one virtual boundary.

20. An apparatus as claimed in claim 18, wherein processing the received scene data to generate the response event is performed where at least one condition is satisfied and is not performed where the at least one condition is not satisfied.

21. A computer program code embodied on a non-transitory computer-readable storage medium, that when performed with at least one processor, causes the at least one processor to perform:
recognize at least one gesture to define at least one computer-implemented virtual boundary in a monitoring space, wherein the at least one gesture comprises a motion along a path and at a location in a monitored scene space, wherein there is a correspondence between the monitoring space and the monitored scene space;
cause implementation of the at least one virtual boundary in the monitoring space corresponding to the monitored scene space, wherein at least part of the at least one virtual boundary is determined with the path in the monitored scene space and the at least part of the at least one virtual boundary is located in the monitoring space at a corresponding location equivalent to the path location;
recognize at least one user interaction with the location in the monitored scene space, wherein the at least one user interaction is configured to cause feedback regarding whether the at least one virtual boundary has been implemented, wherein the at least one user interaction comprises a user crossing through the location, wherein the at least one gesture is different from the at least one user interaction;
in response to recognizing the at least one user interaction, provide the feedback, without generating a response event configured to indicate a change in a portion of the monitored scene space, to confirm that the at least one virtual boundary is implemented at least at the location in the monitored scene space; and
after the feedback has been provided, process received scene data to generate the response event when there is, relative to the at least one virtual boundary, the change in the portion of the monitored scene space.

* * * * *